United States Patent [19]

Buehler et al.

[11] Patent Number: 5,098,969
[45] Date of Patent: Mar. 24, 1992

[54] PROPYLENE POLYMERIZATION USING MODIFIED SILICA BASED CATALYST

[75] Inventors: Charles K. Buehler, Naperville; Richard W. Fries, Joliet; Thomas J. Pullukat, Hoffman Estates, all of Ill.

[73] Assignee: Quantum Chemical Corporation, New York, N.Y.

[21] Appl. No.: 569,688

[22] Filed: Aug. 20, 1990

Related U.S. Application Data

[60] Division of Ser. No. 326,708, Mar. 21, 1989, Pat. No. 4,950,631, which is a continuation of Ser. No. 99,190, Sep. 21, 1987, abandoned.

[51] Int. Cl.$^5$ .............................................. C08F 4/654
[52] U.S. Cl. .................................. 526/119; 526/351; 502/119; 502/120
[58] Field of Search ........................................ 576/119

[56] References Cited

U.S. PATENT DOCUMENTS

| | | | |
|---|---|---|---|
| 3,135,809 | 6/1964 | Bosmajian | 260/650 |
| 3,591,656 | 6/1971 | Kroll | 260/683.9 |
| 4,156,063 | 5/1979 | Giannini et al. | 526/114 |
| 4,220,554 | 9/1980 | Scata et al. | 252/429 B |
| 4,226,741 | 10/1980 | Luciani et al. | 252/429 B |
| 4,298,718 | 11/1981 | Mayr et al. | 526/125 |
| 4,390,454 | 6/1983 | Cuffiani et al. | 252/429 B |
| 4,495,338 | 1/1985 | Mayr et al. | 502/125 |
| 4,508,843 | 4/1985 | Etherton et al. | 502/115 |
| 4,526,941 | 7/1985 | Sakurai et al. | 526/127 |
| 4,530,913 | 7/1985 | Pullukat et al. | 502/104 |
| 4,565,795 | 1/1986 | Short et al. | 502/110 |
| 4,595,735 | 6/1986 | Nomura et al. | 526/125 |
| 4,612,299 | 9/1986 | Arzoumanidis et al. | 502/104 |
| 4,647,550 | 3/1987 | Kohora et al. | 502/115 |
| 4,686,199 | 8/1987 | Tachikawa et al. | 502/104 |
| 4,738,942 | 4/1988 | Nowlin | 502/104 |
| 4,743,665 | 5/1988 | Sasaki et al. | 526/348 |
| 4,849,483 | 7/1989 | Tachikawa et al. | 526/97 |
| 4,950,631 | 8/1990 | Buehler et al. | 502/119 |

FOREIGN PATENT DOCUMENTS

| | | |
|---|---|---|
| 0206172 | 12/1986 | European Pat. Off. |
| 162607 | 9/1983 | Japan |
| 62-124105 | 6/1987 | Japan |
| 2184448 | 6/1987 | United Kingdom |

OTHER PUBLICATIONS

Ser. No. 590,992, filed 7/88, Buchler et al.
Ser. No. 498,308, filed 10/87, Buehler.

*Primary Examiner*—Patrick P. Garvin
*Attorney, Agent, or Firm*—Kenneth D. Tremain; Richard G. Jackson

[57] ABSTRACT

A process for making a propylene polymer which comprises polymerizing propylene under propylene polymerization conditions in the presence of a catalyst system which includes a catalyst component comprising (I) the product obtained by (a) treating silica to remove surface hydroxyl groups; (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound; (c) contacting the product of step (b) with at least one titanium-containing compound having the structural formula $Ti(OR)_nX_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula $TiX^1_p(OR^1)_q$, where $X^1$ is halogen; $R^1$ is aryl or alkyl; p is an integer of 1 to 4; q is 0 or an integer of 1 to 3; and the sum of p and q is 4; a second catalyst component (II), an aluminum-containing compound selected from the group consisting of an alkyl aluminum, an alkyl aluminum halide and mixtures thereof; and a third catalyst component (III), a silane compound.

7 Claims, No Drawings

PROPYLENE POLYMERIZATION USING MODIFIED SILICA BASED CATALYST

This is a division of copending application Ser. No. 326,708, filed on Mar. 21, 1989, now U.S. Pat. No. 4,950,631, which is a continuation of application Ser. No. 099,190, filed on Sept. 21, 1987, now abandoned.

BACKGROUND OF THE DISCLOSURE

1. Field of the Invention

The instant invention is directed to a catalyst useful in the polymerization of propylene. More particularly, the instant invention is directed to a catalyst, useful in the polymerization of propylene, wherein a silica support is modified and thereafter treated with magnesium and titanium compounds.

2. Background of the Prior Art

The polymerization of olefins using Ziegler-Natta catalysts is widely utilized. These catalysts provide polyolefins in high yield possessing the desired characteristics of these polymers. However, the use of these conventional catalysts are subject to important failings. Thus, new and improved catalysts are continually being sought. An important class of catalysts where improvement is sought is the very commercially important alpha-olefin, propylene.

Commonly in the polymerization of propylene a catalyst having a magnesium halide support is utilized. However, when polypropylene polymerized from a magnesium halide supported catalyst is processed into molded products, the polypropylene molding machine processing this polymer is subjected to corrosion. This corrosion is caused by the residual presence of magnesium halide in the polypropylene product. The adverse effect of this corrosion is not limited to damaging expensive molding machinery. More importantly, the polypropylene molded article processed in this equipment is characterized by aesthetic flaws.

Another detrimental property of catalysts, conventionally used in the polymerization of propylene polymers, involves the characteristic in many propylene catalysts of the prior art that they incorporate internal electron donors to insure that the propylene polymer product is highly isotactic. Those skilled in the art are aware of the criticality of stereoregularity in propylene polymers. However, those skilled in the art are also aware that the presence of internal electron donors creates difficulties. Unless the amount and type of electron donor compound is carefully selected not only is the stereoregularity of the resultant polymer deficient but poor catalytic activity often results. This detrimental effect occurs even if the amount and type of electron donor is properly chosen if the catalyst is formed with the electron donor compound added in the wrong sequence.

The utilization of electron donor compounds often creates additional problems involving offensive odors in the final polymeric product. This unfortunate result obtains even if the ideal electron donor compound, in the correct concentration, added at the proper time in the catalyst formation process, is utilized. Thus, polymers formed from catalysts which include an electron donor compound must oftentimes be deashed or deodorized in order to insure that the final product gives off no odor.

The difficulties discussed above have spurred workers skilled in this art to develop new catalysts which attempt to overcome these difficulties. In one such attempt at eliminating the problem created by halogen-containing carriers, inorganic oxides, such as silica, were proposed as a support. This carrier, containing no halogen, was reacted with a magnesium dialkoxide and an electron donor, such as a carboxylic acid monoester, and a titanium halide compound. This catalyst is described in Japanese Patent Publication 62,607/1983.

Even if the allegations made in this disclosure of high catalytic activity, production of a highly stereospecific polymer having a high bulk density and narrow particle size distribution were correct, still the problems associated with odor are not addressed by the use of this catalyst. However, testing of this catalyst establishes that the catalyst provides low activity and that the polymer product is characterized by insufficient stereoregularity and poor particle size distribution.

A more recent disclosure, U.S. Pat. No. 4,595,735, provides a catalyst component for the polymerization of olefins prepared by contacting a magnesium alkoxide, a halogenated hydrocarbon, a halogenated silane and a titanium compound. It is emphasized that this catalyst, useful in the polymerization of ethylene homopolymers and copolymers, incorporates a halogenated hydrocarbon. This catalyst is not only principally directed to the polymerization of ethylene polymers but, significantly, emphasizes the formation of high melt index polymers. Those skilled in the art are aware of the necessity for commercially useful polypropylene to possess low melt flow rates. That is, the molecular weight of the polymers produced in accordance with the '735 catalyst is significantly lower than that required of polypropylene.

U.S. Pat. No. 4,565,795 sets forth an olefin polymerization catalyst which is prepared by the reaction of a chemically treated silica support with a dihydrocarbyl magnesium compound and a halogenated tetravalent titanium compound. The chemical treatment of the silica support involves the use of a chlorinating compound, an alkanol, a silating compound, an acid chloride or an organoboron compound. Again, this catalyst includes constituents which are adverse to the production of stereoregular polymers, especially polypropylene. It is thus not surprising that this catalyst is suggested for use in the polymerization of ethylene polymers.

The above remarks make clear the continuing need in the art for a new polypropylene catalyst having the desirable properties enumerated above. They also establish that the recent prior art has not met that need.

BRIEF SUMMARY OF THE INVENTION

The present invention is directed to a catalyst which, when added to propylene polymerization reactions, produce propylene homopolymers and copolymers of high stereoregularity. The propylene polymer product of polymerization reactions using the catalyst of this invention is characterized by uniform particle size distribution, good spherical morphology and high bulk density. These polypropylene characteristics enhance the productivity and processability of the polymer. In addition, the catalyst is itself highly active, resulting in high polymer productivity as manifested by weight of polymer per unit weight of catalyst.

The catalyst of this invention is also characterized by safe and easy preparation. Unlike magnesium halide supported catalysts expensive ballmilling is not required. Neither is other expensive prepolymerization steps required of magnesium halide supported catalysts.

Because the catalyst includes no halogen in the support, the product polymer has low halogen content, significantly reducing the problems of corrosion oftentimes encountered in the processing of such polymers. Moreover, because the catalyst retains low residual metal content, no deashing of the polymer product is required. Finally, the polymerization reaction utilizing this catalyst is enhanced due to its relative constant activity over long periods of time. Finally, the use of the subject catalyst allows for easy control of polymer molecular weight with the judicious addition of hydrogen.

In accordance with the present invention a catalyst is provided. The catalyst comprises the product obtained by pretreating silica to remove surface hydroxyl groups and replacing them with a surface characterized by the structural formula

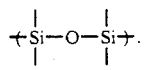

The silica, which acts as a support, is modified by contacting it with a modifying compound selected from the group consisting of silicon halides, boron halides, aluminum halides, alkyl silicon halides, hexaalkyl disilazanes and mixtures thereof. The silica is also treated with at least one hydrocarbon soluble magnesium compound. The modified silica supporting magnesium is additionally contacted with a titanium-containing compound having the structural formula $Ti(OR)_nX_m$, where R is aryl, alkyl or mixtures thereof; X is halogen; n is an integer of 1 to 4; and m is 0 or an integer of 1 to 3 with the proviso that the sum of n and m is 4. The magnesium and titanium supported silica is then treated with a titanium-containing compound having the structural formula $TiX^1_p(OR^1)_q$ where $X^1$ is halogen; $R^1$ is aryl or alkyl; p is an integer of 1 to 4; and q is 0 or an integer of 1 to 3 with the proviso that the sum of p and q is 4.

In another aspect of the present invention a process for polymerizing propylene is disclosed. In this process propylene is polymerized under propylene polymerization conditions utilizing the catalyst of the present invention. In addition, a first co-catalyst, an aluminum-containing compound, and a second co-catalyst, a hydrocarbyl alkoxysilane, is employed.

DETAILED DESCRIPTION

The catalyst of the present invention is prepared by first modifying the surface of silica, which acts as a carrier, to replace hydroxyl groups with a surface whose structural formula is defined by

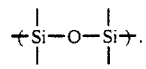

In one embodiment this surface treatment is effected by calcining the silica in an inert atmosphere, preferably, at a temperature of at least 200° C. More preferably, the calcining treatment involves calcining the silica at a temperature in the range of between about 550° C. and about 650° C. in an inert atmosphere, preferably a nitrogen atmosphere.

In a preferred embodiment, the removal of surface hydroxyl groups is accomplished by treating the silica with a hexaalkyl disilazane. Of the hexaalkyl disilazanes useful in this application, hexamethyl disilazane is preferred.

The silica, whose surface is modified as above, is preferably defined by a surface area in the range of between about 80 and about 300 square meters per gram, median particle size of about 20 to about 200 microns and a pore volume of between about 0.6 to about 3.0 cc/gram.

The silica employed in the catalyst of the subject invention is preferably pure but may contain minor amounts of other inorganic oxides such as alumina, titania, zirconia, magnesia and the like. In general, the silica support comprises at least 90% by weight pure silica. More preferably, the weight percentage of pure silica is at least 95%. Most preferably, the weight percentage of pure silica is at least 99%.

The modified silica is further modified by treatment with a modifying compound. Modifying compounds within the contemplation of the present invention include silicon halides, boron halides, aluminum halides, alkyl silicon halides and mixtures thereof. Of these, silicon halides, boron halides and aluminum halides are preferred. More preferably, the modifying compound is silicon tetrachloride, boron trichloride or aluminum trichloride. The contact between the one or more modifying compounds and silica usually occur at a temperature in the range of between about 0° C. and about 100° C. over a time period of between about 30 minutes and about 2 hours. More preferably, this contact occurs over a period of 45 minutes and 1½ hours at a temperature in the range of between about 50° C. and about 75° C.

The silica support, in addition to being treated with a modifying compound, as discussed immediately above, is also contacted with a hydrocarbon soluble magnesium-containing compound. Hydrocarbon soluble magnesium compounds that can be used in the preparation of the catalyst of this invention include dihydrocarbyloxy magnesiums, hydrocarbyloxymagnesium halides and mixtures thereof. Preferably, the magnesium compounds are magnesium alkoxides, alkoxymagnesium halides and mixtures thereof. Especially preferred magnesium compounds contemplated for use in the catalyst formation of the present invention include 2-methylpentoxymagnesium chloride, pentoxymagnesium chloride, di-2-ethylhexyloxymagnesium and mixtures thereof.

The reaction between the silica support and the soluble magnesium compound or compounds usually occurs at a temperature in the range of between about 0° C. and about 100° C. More preferably, this reaction occurs at a temperature in the range of between about 50° C. and 100° C. Most preferably, the reaction occurs at a temperature in the range of between about 60° C. and about 80° C. The reaction occurs over a period of between about 5 minutes and 2 hours. More preferably, the reaction occurs over a period of between about 45 minutes and 1½ hours.

It is emphasized that although the contact between the modifying compound and the soluble magnesium compound are discussed above in that order, the sequence of silica treatment involving these two compounds is independent. That is, these two treatment steps can occur in either order.

The silica support is next contacted with a titanium-containing compound having the structural formula $Ti(OR)_nX_m$ where R is aryl, alkyl or mixtures thereof; X is halogen; n is an integer of 1 to 4; and m is 0 or an integer of 1 to 3 with the proviso that the sum of n and m is 4.

In a preferred embodiment, the titanium-containing compound is one or more of tetrahydrocarbyloxytitaniums, trihydrocarbyloxytitanium halides, dihydrocarbyloxytitanium dihalides and mixtures thereof.

In a preferred embodiment the titanium-containing compound is a titanium ester free of halide. That is, the titanium compound is characterized by n being 4 and m being 0. Particularly preferred titanium esters proposed for use in the formation of the catalyst of the subject invention include tetracresyl titanate, titanium tetrabutoxide, titanium tetranonolate, tetra-2-ethylhexyl titanate, tetraisobutyl titanate, tetra n-propyltitanate, tetraisopropyltitanate and the like.

The reaction between the silica and the titanium compound occurs at a temperature in the range of between about 0° C. and 120° C. More preferably, the reaction occurs at a temperature in the range of between about 50° C. and about 100° C. Still more preferably, the reaction takes place at a temperature in the range of between about 60° C. and about 80° C.

The final step in the preparation of the catalyst of this invention involves contacting the silica support subject to earlier treatment with the modifying compound, the magnesium compound and the titanium compound with a titanium-containing compound having the structural formula $TiX^1{}_p(OR^1)_q$ where $X^1$ is halogen, $R^1$ is aryl or alkyl; p is an integer of 1 to 4; and q is 0 or an integer of 1 to 3 with the proviso that the sum of p and q is 4.

More preferably, p is an integer of 2 to 4 and q is 0, 1 or 2.

Among the titanium-containing compounds within the contemplation of this class are titanium tetrachloride, titanium tetrabromide, methoxytitanium trichloride, ethoxytitanium trichloride, diethoxytitanium dichloride and the like.

Most preferably, p is an integer of 4 and q is 0. That is, most preferably, the titanium compound is a titanium tetrahalide. Of these, especially titanium tetrachloride is particularly preferred.

The reaction between the silica composition and the titanium halide occurs at a temperature in the range of between about 0° C. and about 150° C. More preferably, the temperature of this reaction is in the range of between about 50° C. and about 120° C. Most preferably, the temperature of this contact is in the range of between about 80° C. and about 100° C.

The titanium compound and the silica composition is reacted for a period in the range of between about 1¾ hour and 4 hours. More preferably, the reaction occurs over a period of between about 1 hour and 3½ hours. Most preferably, the time of reaction is between 1¾ hours and 3 hours.

It should be appreciated that all the treatment steps in the formation of the catalyst of this invention, the reaction of silica with the modifying compound, the hydrocarbon soluble magnesium compound and the two titanium compounds involve the reaction between a solid, silica, and a liquid. This is because each of the compounds that are contacted with the silica are liquids. That is, the compounds are liquids at ambient conditions or are soluble in an inert hydrocarbon solvent. As such, no ballmilling or other solid mixing is required. This expensive and difficult operation, common to the formation of polymerization catalysts of the prior art, is thus eliminated. Those skilled in the art are aware that, in the case where a hydrocarbon solvent is employed, the solvent may be allowed to remain with the reaction mass or can be removed by decantation, filtration or evaporation.

Further observations regarding the above formation steps include the fact that the morphology of the polymer produced from this catalyst emulates that of the support upon which the above-recited reactions occur; that the absence of any halogen in the support aids in keeping the halogen content of the polymer produced therefrom very low; that the relatively low concentrations of titanium and magnesium on the silica support tends to keep the concentration of magnesium and titanium residues in the polymer formed at similarly low levels; that the synthesis of the catalyst occurs at moderate temperature, preferably, in the range of between about 0° C. and 100° C.; and that even though this catalyst does not need an electron donor for good isotacticity it is possible to use them if desired. If an election donor is used alkoxysilanes, alkylbenzoates, alkylphthalates or the like is preferred.

Another aspect of the present invention involves the use of the catalyst of the present invention in the polymerization of propylene to produce polypropylene and propylene copolymers. In this process propylene is polymerized under propylene polymerization conditions in the presence of the catalyst of the instant invention.

Present also is a co-catalyst, an aluminum-containing compound. The aluminum compound is preferably an alkylaluminum, an alkylaluminum halide or mixtures thereof. More preferably, the co-catalyst is an aluminum alkyl. Of the aluminum alkyls, triethylaluminum and triisobutylaluminum are particularly preferred.

A second co-catalyst is also employed in the propylene polymerization process of the present invention. The second co-catalyst of this invention is preferably at least one silane compound. Preferably, the silane compound is a hydrocarbyl alkoxysilane. Preferred hydrocarbyl alkoxysilanes include hydrocarbyl trialkoxysilanes, dihydrocarbyl dialkoxysilanes and trihydrocarbyl alkoxysilanes. Of the hydrocarbyl trialkoxysilanes, those preferred involve a hydrocarbyl having the meanings phenyl and $C_1-C_6$ alkyl; and a $C_1-C_{10}$ trialkoxy. Particularly preferred species include hexyltrimethoxysilane, amyltriethoxysilane and isobutyltrimethoxysilane.

The usual propylene polymerization conditions involve a polymerization temperature in the range of between about 35° C. and about 100° C. More preferably, the temperature of this reaction is in the range of about 50° C. and about 80° C. The pressure of the propylene polymerization reaction is in the range of between about 300 psig and about 600 psig, more preferably, between about 400 psig and about 500 psig.

The following examples are given to illustrate the scope of this invention. Because these examples are given for illustrative purposes only, the invention embodied therein should not be limited thereto.

EXAMPLE 1

Catalyst Preparation

A catalyst was prepared by introducing 12.5 mmol of silicon tetrachloride and 5.0 g of silica previously calcined in nitrogen at 600° C. in a slurry of 500 ml. heptane into a 3-neck, 250 ml. round bottom flask equipped with a nitrogen purge, a paddle stirrer, a stirring gland, a condenser and a bubbler. This slurry was stirred for one hour at 60° C. The silica utilized in this example had a surface area of 300 m²/g, a median particle size of 80-90 microns and a pore volume of 1.3 cc/g. Thereafter, 12.5 mmol of 2-methylpentyloxymagnesium chloride was added and reacted with the silica slurry for one hour at 70° C. Following this step 3.175 mmol of tetracresyltitanate was added. The titanate was allowed to react with the slurry for one hour at 70° C.

The solid product of these reaction steps was allowed to settle and the supernatant was syphoned off. Fifty ml of fresh heptane was added to the solid and stirred without further heating. The solid was again allowed to settle and the supernatant syphoned off. This washing step was repeated three times until a total of 200 ml. of supernatant was removed. Liquid titanium tetrachloride was added to the washed solid and allowed to react with the solid for two hours at 80° C. to 100° C. with stirring. The solid product of this reaction was washed three times with heptane, as described in the previous washing step, until 300 ml. of supernatant, inclusive of all washings, was removed. The remainder of the solvent was evaporated to produce a salmon-colored, free-flowing spherically-shaped solid catalyst.

EXAMPLE 2

Catalyst Preparation

A catalyst was prepared in accordance with the procedure of Example 1. However, due to minor variations in the washing procedures, set forth in Example 1, the concentration of magnesium and titanium in the final product varied therefrom. Specifically, whereas the concentration of Mg and Ti of the catalyst of Example 1 was 3.49 weight % and 2.56 weight %, respectively, the concentration of Mg and Ti in the catalyst of the present example was 3.60 weight % and 3.90 weight % respectively.

EXAMPLES 3 TO 5

Preparation of Catalysts

Three additional catalysts were prepared in accordance with the procedure of Example 1 except that the 5.0 g of silica was pretreated with hexamethyl disilazane rather than the calcining step of Examples 1 and 2. Moreover, the concentration of magnesium, contributed to by the treatment with 2-methylpentyloxymagnesium chloride, and the titanium concentration, provided by tetracresyl titanate and titanium tetrachloride, varied such that the concentration of magnesium in the catalyst of Examples 3, 4 and 5 was 3.60 weight %, 1.92 weight % and 3.10 weight %, respectively, based on the total weight of the final catalyst. Similarly, the weight percent of titanium in the catalysts of Examples 3, 4 and 5 was 3.60%, 1.37% and 2.50%, respectively. These differences were due to minor variations in the washing procedures.

EXAMPLE 6

Propylene Polymerization Utilizing Catalysts of Examples 1-5

Liquid propylene was separately reacted with each of the catalysts of Examples 1 to 5. In addition to 40 mg of the catalyst of each of Examples 1 to 5 two co-catalysts were utilized. These two co-catalysts were triethylaluminum and isobutyltrimethoxysilane (IBTMS). The amounts of the triethylaluminum and IBTMS employed were such that the molar ratio of aluminum to titanium to IBTMS was 40:1:8, respectively. Each propylene polymerization reaction was conducted at a pressure of 460 psig and a temperature of 70° C. In each of these runs, 4.5 mmol of hydrogen was used to control the molecular weight of the propylene homopolymer product.

The results of these polymerizations are summarized in Table 1. It is noted that the polymerization reaction time was one hour in each case except for the polymerization of the catalyst of Example 3 wherein two runs were employed utilizing one and two hour reaction times. Moreover, the one hour polymerizations involving the catalysts of Examples 2 and 5 were repeated 2 and 3 times, respectively. These runs, and the results thereof, are summarized in Table 1.

TABLE 1

| Catalyst of Example No. | Wt % Ti | Wt % Mg | Reaction Time, hr. | Productivity[a] g PP/g Ti | g PP/g Total Cat. | % HI[b] | MFR[c] |
|---|---|---|---|---|---|---|---|
| 1 | 2.56 | 3.49 | 1 | 200,000 | 4775 | 98.0 | 2.0 |
| 2 | 3.90 | 3.60 | 1 | 143,000 | 4575 | 96.4 | 2.6 |
|   |      |      | 1 | 125,000 | 4110 | 94.4 | 6.6 |
| 3 | 3.60 | 3.60 | 1 | 143,000 | 5000 | 96.0 | 2.0 |
|   |      |      | 2 | 167,000 | 5700 | 94.5 | 2.2 |
| 4 | 1.37 | 1.92 | 1 | 143,000 | 4900 | 95.0 | 2.0 |
| 5 | 2.50 | 3.10 | 1 | 143,000 | 3450 | 94.0 | 1.4 |
|   |      |      | 1 | 143,000 | 3500 | 95.3 | 3.0 |
|   |      |      | 1 | 167,000 | 4625 | 94.9 | 1.5 |

[a] Weight of polypropylene produced per unit weight of catalyst reported on the basis of titanium concentration and total catalyst.
[b] HI - Heptane insolubles
[c] MFR - Melt flow rate as measured by ASTM Test D-1238, Method D.

EXAMPLES 7 AND 8

Effect of Second Co-catalyst

The effect of the second co-catalyst was considered in these examples. In Examples 7 and 8, propylene polymerizations were conducted in accordance with the procedure of Example 6. The catalyst of Example 2 was utilized. In addition, the first co-catalyst of Example 2, triethylaluminum, was used in these examples. However, the second co-catalyst of Example 2, the electron donor, IBTMS, was replaced in Examples 6 and 7 with another electron donor, phenyl triethoxysilane (PES). In addition, the mole ratio of aluminum to titanium to the second co-catalyst electron donor (Al/Ti/ED) of Example 2, 40:1:8, was changed in Example 7 to 20:1:10 and in Example 8 to 20:1:2.5. Thus, Examples 7 and 8 differed from each other on the basis of the concentration of PES charged into the polymerization reactor.

The results of Examples 6 and 7 are tabulated in Table 2. For comparative purposes the polymerization experiment of Example 2 is included in Table 2.

TABLE 2

| Catalyst of Example No. | Second Co-catalyst | Al/Ti/ED Mole Ratio | Productivity g PP/g Ti | Productivity g PP/g Total Cat. | % HI | MFR |
| --- | --- | --- | --- | --- | --- | --- |
| 2 | IBTMS | 40/1/8 | 143,00 | 4575 | 96.4 | 2.5 |
| 7 | PES | 20/1/10 | 83,300 | 3450 | 87.8 | 4.6 |
| 8 | PES | 20/1/2.5 | 90,900 | 4700 | 87.8 | 1.3 |

EXAMPLES 9-11 AND COMPARATIVE EXAMPLE 1 TO 7

Effect of Silica Surface Modifying Compounds

The effect of silica surface modifying compounds was examined in these examples. In all of, these examples the silica was pretreated with 1.2,5 mmols of hexamethyl disilazane (HMDS) per gram of silica. Variation among the examples involved the identity and amount of the modifying compounds. The identity and amount of the modifying compound is reported in Table 3.

In CE1 and CE2 no such compound was employed. Both of the catalysts formed in these examples, formulated otherwise in accordance with that of Example 4, were unsuccessful. The catalyst of CE1 yielded no polypropylene when propylene was polymerized in accordance with Example 6. Although the catalyst of CE2 produced polypropylene the product yield was very low and unacceptable.

Use of modifying compounds outside the scope of the catalyst of this invention, otherwise formed in accordance with the formation of the catalyst of Example 4, specifically 2-methyl-2-chloropropanol, phosphorus trichloride, benzoyl chloride, ethylchloroformate and trichloroethane of Comparative Examples 3, 4, 5, 6 and 7, respectively, all produced polypropylene which was deficient not only in productivity but, in addition, all produced polymers deficient in isotacticity, as manifested by percent heptane insolubles of less than 95%.

It is noted that all of these compounds, outside the scope of the modifying compounds of the catalyst of this invention, were, like the modifying compounds of the present invention, halides, specifically, chloride It is also emphasized that two compounds within the scope of the present invention, boron trichloride and aluminum trichloride, (Examples 9 and 10, respectively) produced excellent results in terms of their productivity and the properties of the polymer produced. Indeed, these results marginally exceeded those of Example 4, which differed from Examples 9 and 10 only in so far as the silicon tetrachloride modifier of Example 4 was replaced with $BCl_3$ and $AlCl_3$.

All of these results are tabulated in Table 3. For comparative purposes Example 4 is included in that table because but for the differences in the surface modifying treatment of silica, all of the catalysts of these examples were prepared in accordance with Example 4.

TABLE 3

| Catalyst of Example No. | $SiO_2$ Treatment | mmol of $SiO_2$ Treat per g. $SiO_2$ | Wt % Ti | Wt % Mg | Productivity g PP/g Ti | Productivity g PP/g Total Cat. | % HI | MFR |
| --- | --- | --- | --- | --- | --- | --- | --- | --- |
| 4 | $SiCl_4$ | 2.5 | 1.37 | 1.92 | 143,000 | 4,900 | 95.0 | 2.0 |
| 9 | $BCl_3$ | 3.3 | 2.89 | 3.88 | 250,000 | 5,250 | 96.4 | 2.6 |
| 10 | $AlCl_3$ | 3.24 | 3.71 | — | 250,000 | 5,425 | 95.9 | 1.1 |
| CE1 | None | — | — | — | No product | | | |
| CE2 | None | — | 4.9 | 3.13 | — | 410 | — | — |
| CE3 | 2-Methyl-2-chloropropanol | 2.5 | 2.57 | .96 | 16,700 | 221 | 85.0 | — |
| CE4 | $PCl_3$ | 3.3 | 1.65 | 2.48 | 21,300 | 267 | 91.0 | — |
| CE5 | Benzoyl chloride | 10.0 | 2.48 | 2.74 | 111,000 | 1,822 | 80.9 | 6.0 |
| CE6 | Ethylchloroformate | 2.5 | 3.16 | 3.56 | 66,700 | 1,612 | 90.9 | 8.1 |
| CE7 | Trichloroethane | 2.5 | — | — | No product | | | |

EXAMPLE 11 AND COMPARATIVE EXAMPLE 8

Effect of the Solubility of Magnesium Compound

In these examples the criticality of a soluble magnesium source is emphasized. In Example 11 a mixed dialkoxy magnesium source, specifically, a mixture of $C_5$ to $C_{11}$ dialkoxymagnesium, was employed. It produced acceptable results, as established in Table 4, discussed below.

In Comparative Example 8 equal molar quantities of diethoxymagnesium, a magnesium compound within the scope of the present invention, was mixed with magnesium chloride, outside the scope of the invention by comilling the solid magnesium chloride and the solid diethoxymagnesium. The resultant catalyst of Comparative Example 8, a solid, produced a catalyst having unacceptably low catalyst productivity, as well as very low isotacticity, as manifested by 78.4% heptane insolubles, and a melt flow rate too high to measure, indicative of a very low degree of polymerization.

These results are summarized in Table 4 which includes the results obtained for the catalyst of Example 1. The results obtained polymerizing propylene with the catalyst of Example 1 is reproduced since the catalysts of Example 11 and Comparative Example 8 were formed in accordance with the procedure of Example 1 except for the variation involving the use of the magnesium compound.

TABLE 4

| Catalyst of Example No. | Mg Source | mmol Mg/ g SiO₂ | Wt % Ti | Wt % Mg | Productivity g PP/g Ti | Productivity g PP/g Total Cat. | % HI | MFR |
| --- | --- | --- | --- | --- | --- | --- | --- | --- |
| 1 | 2-Methyl-pentoxy magnesium chloride | 2.5 | 2.56 | 3.49 | 200,000 | 4,775 | 98.0 | 2.0 |
| 11 | Mixed $C_5$-$C_{12}$ branched dialkoxy-magnesium | 2.5 | 6.50 | 5.15 | 143,000 | 5,700 | 94.9 | 1.3 |
| CE8 | Ethoxy mag-* nesium chloride | 2.5 | 3.80 | 2.95 | 41,700 | 1,125 | 78.4 | — |

*Prepared by extensive comilling of equal molar amounts of magnesium chloride and diethoxy magnesium. This material was a solid.

EXAMPLES 12 TO 14 AND COMPARATIVE EXAMPLE 9

Effect of Titanium Esters

These examples illustrate the importance of titanium esters on the formation of the catalyst of the present invention. In all of these examples the catalyst was formed in accordance with the procedure of Example 1 except for the step involving contacting the silica support with a titanium ester. In Examples 12 and 13, titanium tetrabutoxide and titanium tetranonolate, respectively, replaced the titanium ester of Example 1. The concentration of the esters of Examples 12 and 13 were identical with that of Example 1. In Example 14 the replacement titanium ester, tetra-2-ethylhexyltitanate, was used in substantially the same concentration. In all three examples the polypropylene product characteristics were acceptable albeit inferior to those obtained utilizing the catalyst of Example 1. Catalyst productivity of the catalysts of Examples 12 to 14 was inferior to the catalyst of Example 1 although within acceptable levels. In Comparative Example 9, the steps of treating the silica with a titanium ester was omitted. The catalyst of this example yielded a catalyst productivity too low for commercial acceptability.

The results of these examples, with the inclusion of Example 1 as a comparison, is summarized in Table 5.

silica calcined at 600° C. in nitrogen with alumina calcined at 200° C. in nitrogen.

When this catalyst was employed in the polymerization of propylene in accordance with the procedure of Example 6 the catalyst activity was found to be 52,600 grams of polypropylene per gram of titanium, an unacceptably low value. Moreover, the degree of stereoregularity, manifested as the percent heptane insolubles, was only 90.7, far below the desirable 95% isotacticity, levels obtained using the catalysts within the scope of the present invention.

COMPARATIVE EXAMPLES 15 AND 16

Effect of the Use of Internal Electron Donors

Examples 15 and 16 illustrate the effect of internal electron donors in the formation of catalysts within the contemplation of the present invention. In the two examples, the catalyst was prepared in accordance with the procedure utilized in the formation of the catalyst of Example 1. However in Examples 15 and 16, ethyl benzoate was used as an internal electron donor in the formation of the catalyst. In Example 15, 5.90 mmol of ethyl benzoate was introduced into the catalyst by being premixed with tetracresyl titanate. In Example 16, 2.98 mmol ethyl benzoate was introduced into the catalyst by being premixed with titanium tetrachloride.

Table 6 summarizes the results of these examples. Both of these examples employing an internal electron

TABLE 5
EFFECT OF TITANIUM ESTER COMPONENT

| Catalyst of Example | TiOR)₄ | Conc. mmo/g | Wt % Ti | Wt % Mg | Productivity gpp/g Ti | Productivity gpp/g Total Cat. | % HI | MFR |
| --- | --- | --- | --- | --- | --- | --- | --- | --- |
| 1 | Tetracresyl Titanate | .635 | 2.56 | 3.49 | 200,000 | 4775 | 98.0 | 2.0 |
| 12 | Titanium Tetrabutoxide | .635 | 2.15 | 3.57 | 90,900 | 1810 | 94.4 | 2.8 |
| 13 | Titanium Tetranonolate | .635 | 2.45 | 3.46 | 143,000 | 4342 | 95.2 | 3.6 |
| 14 | Tetra-2-ethyl hexyltitanate | 0.64 | 2.34 | 3.45 | 125,000 | 1600 | 92.0 | 4.0 |
| CE9 | None | — | 1.90 | 2.00 | 62,500 | 1187 | 92.7 | 3.0 |

COMPARATIVE EXAMPLE 10

Effect of Silica Carrier

A catalyst was prepared in accordance with the procedure of Examples 1 and 2 but for the substitution of donor produced a satisfactory propylene polymerization catalyst albeit, not as effective as the more preferred embodiment of Example 1. The inclusion of Example 1, the catalyst of which was formed identically, but for the incorporation of an electron donor, in Table 6 establishes the quantitative superiority of the catalyst of Example 1 over those of Examples 15 and 16.

TABLE 6

| Catalyst of Example No. | Internal E.D. Used | Conc. mmol. | Wt % Ti | Wt % Mg | Productivity g PP/g Ti | Productivity g PP/g Total Cat. | % HI | MFR |
| --- | --- | --- | --- | --- | --- | --- | --- | --- |
| 1 | None | — | 2.56 | 3.49 | 200,000 | 4,775 | 98.0 | 2.0 |
| 15 | Ethyl Benzoate[a] | 5.90 | 0.91 | 3.48 | 100,000 | 940 | 92.0 | 2.7 |

TABLE 6-continued

| Catalyst of Example No. | Internal E.D. Used | Conc. mmol. | Wt % Ti | Wt % Mg | Productivity g PP/g Ti | Productivity g PP/g Total Cat. | % HI | MFR |
|---|---|---|---|---|---|---|---|---|
| 16 | Ethyl Benzoate[b] | 2.98 | 1.94 | 3.18 | 143,000 | 1,985 | 93.3 | — |

[a] Electron donor premixed with tetracresyl titanate.
[b] Electron donor premixed with titanium tetrachloride.

EXAMPLE 17

Effect of Sequence of Addition of Catalyst Components

In this example the non-criticality of the sequence of contact between silica and the modifying compound and between silica and the soluble magnesium compound was established.

The catalyst of Example 17 was prepared in exact accordance with the procedure set forth in Example 1. However, in Example 17 the sequence of addition of silicon tetrachloride and 2-methylpentyloxy magnesium chloride was reversed. That is, in Example 17 the magnesium compound was treated with the calcined silica before treatment with silicon tetrachloride. The results obtained from this reversal are depicted in Table 7. Table 7, which includes Example 1, illustrates that the two catalysts of this reversal are substantially equivalent.

TABLE 7

| Catalyst of Example No. | Order of Addition | Wt % Ti | Wt % Mg | Productivity g PP/g Ti | Productivity g PP/g Total Cat. | % HI | MFR g/10 min |
|---|---|---|---|---|---|---|---|
| 1 | SiCl$_4$ + ROMgCl | 3.60 | 3.6 | 143,000 | 5,000 | 96.0 | 2.00 |
| 17 | ROMgCl + SiCl$_4$ | 3.66 | 4.22 | 166,000 | 5,100 | 96.5 | 2.08 |

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for making a propylene polymer comprising polymerizing propylene under propylene polymerization conditions in the presence of
   (I) a catalyst component comprising the product obtained by:
      (a) treating silica to remove surface hydroxyl groups;
      (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of dihydrocarbyloxy magnesium compounds, hydrocarbyloxymagnesium halides and mixtures thereof; said contacting steps (1) and (2) occurring in random order;
      (c) contacting the product of step (b) with at least one titanium-containing compound having the structural formula Ti(OR)$_n$X$_m$, where R is aryl, alkyl or mixtures thereof; X is halogen; n is an integer of 1 to 4; m is 0 or an integer of 1 to 3; and the sum of m and n is 4; and
      (d) treating the product of step (c) with a titanium-containing compound having the structural formula TiX$^1_p$(OR$^1$)$_q$, where X$^1$ is halogen; R$^1$ is aryl or alkyl; p is an integer of 1 to 4; q is 0 or an integer of 1 to 3; and the sum of p and q is 4, with the proviso that the titanium-containing compound of this step is not identical with the titanium-containing compound of step (c);
   (II) an aluminum-containing first co-catalyst component, said component selected from the group consisting of aluminum alkyl compounds, alkyl aluminum halides and mixtures thereof; and
   (III) a silane compound second cocatalyst component.

2. A process for making a propylene polymer comprising polymerizing propylene under propylene polymerization conditions in the presence of
   (I) a catalyst component comprising the product of the steps of
      (a) treating silica having a surface area of about 80 to about 300 m$^2$/g, a median particle size of about 20 to about 200 microns and a pore volume of about 0.6 to about 3.0 cc/g whereby hydroxyl groups on the surface of said silica are removed;
      (b) contacting said treated silica with
         (1) a modifying compound selected from the group consisting of silicon halides, boron halides, aluminum halides and mixtures thereof; and
         (2) a hydrocarbon soluble magnesium-containing compound selected from the group consisting of dihydrocarbyloxy magnesiums, hydrocarbyloxy magnesium halides and mixtures thereof; said sequence of contacting steps (1) and (2) being random;
      (c) contacting the product of step (b) with a titanium ester having the structural formula Ti(OR)$_4$, where R is aryl, alkyl or mixtures thereof; and
      (d) treating the product of step (c) with a titanium halide having the structural formula TiX$^1_4$, where X$^1$ is halogen;
   (II) an aluminum trialkyl first co-catalyst component; and
   (III) a hydrocarbylalkoxysilane second co-catalyst component.

3. A process for making a propylene polymer comprising polymerizing propylene under propylene polymerizing conditions in the presence of
   (I) a catalyst component comprising the product obtained by
      (a) treating silica having a surface area of about 80 to about 300 m$^2$/g, a median particle size of about 20 to about 200 microns and a pore volume of about 0.6 to about 3.0 cc/g to remove hydroxyl groups from the surface of said silica;
(b) contacting the treated silica with
  (1) a compound selected form the group consisting of silicon tetrachloride, boron trichloride and aluminum trichloride; and
  (2) 2-methylpentyloxymagnesium chloride; said contacting steps (1) and (2) being random; and
(c) contacting the product of step (b) with tetracresyl titanate; and
(d) treating the product of step (c) with titanium tetrachloride;
(II) triethylaluminum; and
(III) isobutyltrimethoxysilane.

4. A process in accordance with claim 1 wherein said first co-catalyst component is at least one compound selected from the group consisting of aluminum trialkyl and alkylaluminum halides and mixtures thereof and, said second co-catalyst is a hydrocarbylalkoxysilane.

5. A process in accordance with claim 2 wherein said aluminum trialkyl is triethylaluminum and said hydrocarbylalkoxysilane is a hydrocarbyltrialkoxysilane.

6. A process in accordance with claim 5 wherein said hydrocarbyl trialkoxysilane is isobutyltrimethoxysilane.

7. A process in accordance with claim 3 wherein said polymerization occurs at a temperature in the range of between about 35° C. and 100° C. and a pressure in the range of between about 300 psig and about 600 psig.

* * * * *